United States Patent
Krzesicki et al.

(10) Patent No.: US 6,805,653 B2
(45) Date of Patent: Oct. 19, 2004

(54) SELECTIVELY CONTROLLED LIMITED SLIP DIFFERENTIAL

(75) Inventors: Richard Michael Krzesicki, Ann Arbor, MI (US); Clive McKenzie, Southfield, MI (US); Dennis Cook, Royal Oak, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/211,013

(22) Filed: Aug. 2, 2002

(65) Prior Publication Data

US 2004/0023742 A1 Feb. 5, 2004

(51) Int. Cl.[7] .......................... F16H 48/06; F16H 48/20
(52) U.S. Cl. ........................ 475/233; 74/650; 74/89.23
(58) Field of Search ............................... 475/220–253; 74/650, 89.23–89.25, 89.39

(56) References Cited

U.S. PATENT DOCUMENTS

| | | | |
|---|---|---|---|
| 1,322,689 A | * | 11/1919 | Griffing ........................ 475/247 |
| 3,400,610 A | | 9/1968 | Taylor et al. |
| 3,915,267 A | * | 10/1975 | Shea ........................ 192/217.3 |
| 4,805,486 A | | 2/1989 | Hagiwara et al. |
| 4,895,236 A | | 1/1990 | Sakakibara et al. |
| 5,019,021 A | | 5/1991 | Janson |
| 5,086,861 A | * | 2/1992 | Peterson ..................... 180/445 |
| 5,092,825 A | | 3/1992 | Goscenski, Jr. et al. |
| 5,279,401 A | | 1/1994 | Stall |
| 5,423,235 A | | 6/1995 | Botterill et al. |
| 5,562,192 A | | 10/1996 | Dick |
| 5,862,875 A | * | 1/1999 | Park ........................... 180/248 |
| 6,019,385 A | * | 2/2000 | Kelley et al. ............... 280/217 |
| 6,503,167 B1 | * | 1/2003 | Sturm ......................... 475/231 |

FOREIGN PATENT DOCUMENTS

| | | | | |
|---|---|---|---|---|
| FR | 2635159 A1 | * | 2/1990 | ............ F16H/1/44 |
| GB | 2354563 | | 3/2001 | |
| JP | 04321863 A | * | 11/1992 | ........... F16H/57/04 |

* cited by examiner

Primary Examiner—Tisha Lewis
(74) Attorney, Agent, or Firm—Brinks Hofer Gilson & Lione

(57) ABSTRACT

A differential gear assembly for an automotive vehicle includes a differential housing. A first side gear and a second side gear are substantially axially aligned and spaced apart from one other, each of the side gears being supported by the differential housing for relative rotation therebetween and being adapted to engage an axle half-shaft. A clutch pack is mounted between and interconnects the differential housing and the first side gear. A ball screw assembly is adapted to selectively apply axial force to the clutch pack, thereby locking the first side gear to the differential housing and preventing relative rotational movement of the first side gear and the differential housing.

15 Claims, 3 Drawing Sheets

SELECTIVELY CONTROLLED LIMITED SLIP DIFFERENTIAL

TECHNICAL FIELD OF THE INVENTION

The present invention generally relates to an automotive differential. More specifically, the present invention relates to an automotive differential which can be selectively locked to prevent relative rotation of two axle half shafts.

BACKGROUND OF THE INVENTION

In an automotive vehicle, a differential gear assembly is typically used to transfer power from a rotating driveshaft to the axles and wheels of the vehicle. The rotating driveshaft of the vehicle typically engages a ring gear which is mounted onto a differential housing. The end of the driveshaft and the ring gear are adapted to transfer rotation from the drive shaft to the differential housing such that the differential housing rotates transverse to the driveshaft. Within the differential housing, the ends of the axles of the vehicle are supported and connected to the differential housing through a differential gear set, such as a bevel differential gear set. Thus, the ring gear of the differential housing allows the driveshaft to rotate the differential housing in a direction transverse to the driveshaft, whereby the differential gear set rotates the axles of the vehicle to drive the wheels of the vehicle.

Typically, the differential gear set includes a pair of side gears, and a pair of pinion gears. Most commonly, the pinion gears are supported by a pinion pin which extends across the differential housing. The pinion gears are allowed to rotate on the pinion pin thereby allowing the vehicle axle shafts to rotate relative to one another.

In a limited slip differential assembly, the axle shafts are capable of being locked together such that the rear wheels of the vehicle are not allowed to rotate relative to one another. One way of doing this is to provide a clutch pack within the differential assembly which is mounted between the differential housing and one of the side gears. When an axial force is placed upon the clutch pack, the side gear will be rotationally locked to the differential housing, thereby preventing the two side gears, and thereby the two axle half-shafts from rotating relative to one another.

One way of applying an axial force onto a clutch pack of this type is with a ball ramp. A ball ramp is comprised of a pair of plates having opposing channels formed therein. Within the channels are balls. The height of the balls is such that the plates are not allowed to touch. The channels are ramped such that when one plate rotates relative to the other, the balls will roll up the ramped channels and force the plates apart, thereby producing an axial force.

Over time, the channels within the plates will wear, which means less axial movement of the plates occurs as the ball bearings roll up the ramped surfaces. This reduces the amount of axial force produced by the ball ramp, and affects the performance of the clutch. The only way to repair this condition is to reposition or replace the ball ramp. Further, a ball ramp will only move a limited distance away from the clutch pack. Therefore, the clutch pack cannot be relieved further to allow cooling.

Therefore, there is a need for a differential having a clutch pack for selectively locking one of the side gears to the differential housing having a device that applies an axial force to the clutch pack and can be tuned to accommodate for wear of the clutch pack and wear within the device, as well as allowing the device to be backed away from the clutch pack to allow the clutch pack to cool.

DETAILED DESCRIPTION OF THE PREFERRED EMBODIMENTS

The following description of the preferred embodiments of the invention is not intended to limit the scope of the invention to these preferred embodiments, but rather to enable any person skilled in the art to make and use the invention.

Figure 1:
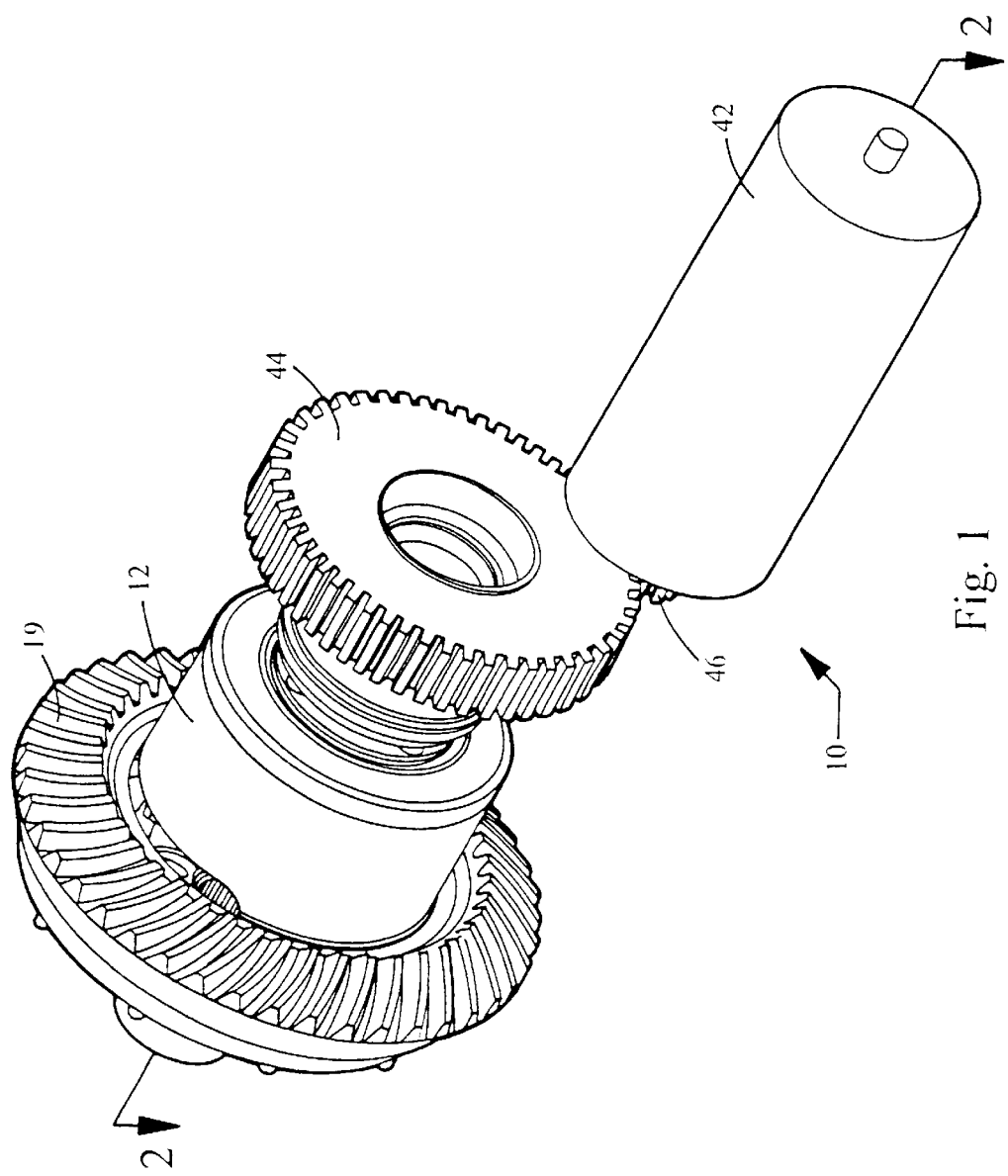
FIG. 1 is a perspective view of a differential assembly of a first preferred embodiment.
Figure 2:
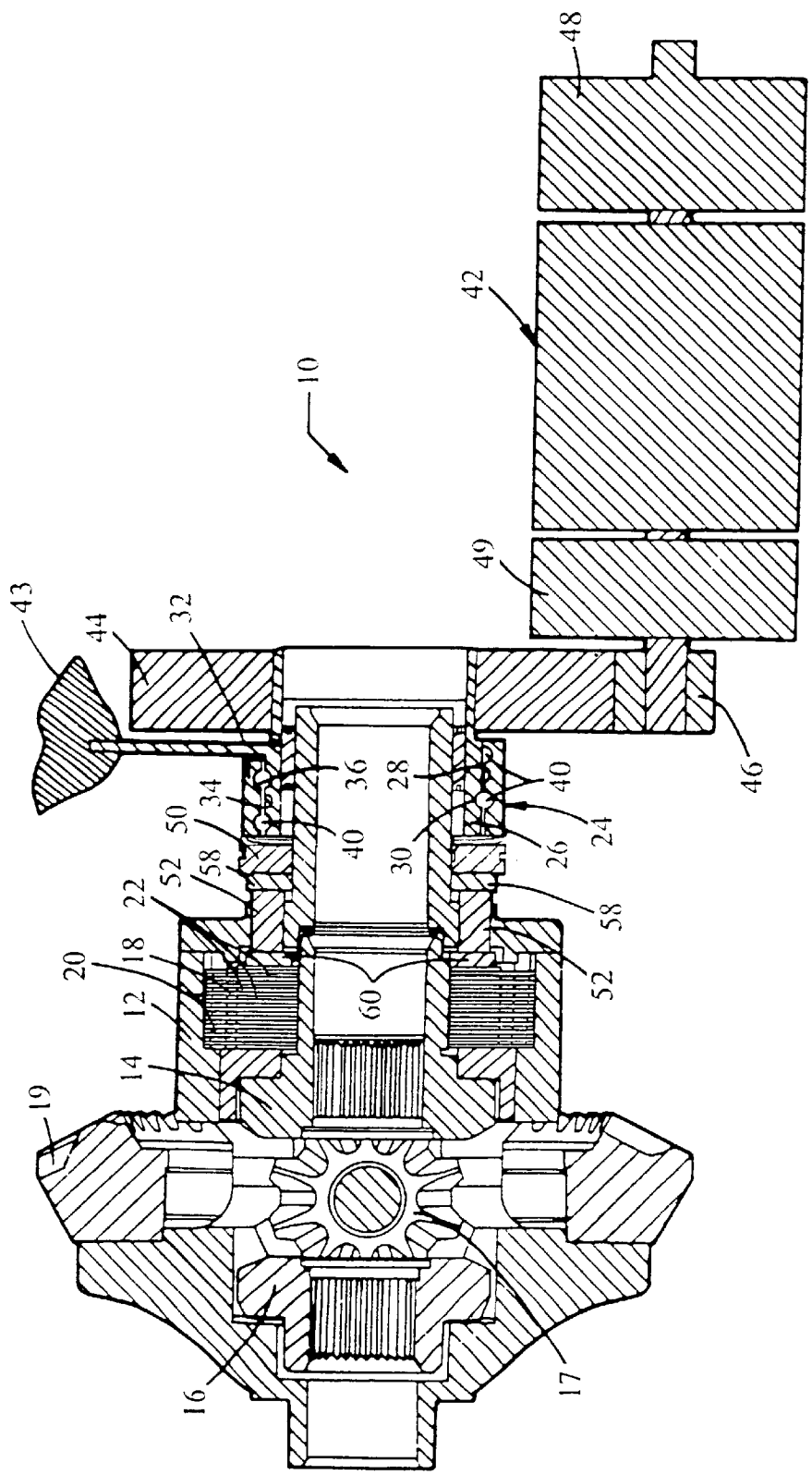
FIG. 2 is a sectional view taken along line 2—2 of FIG. 1.

Referring to FIG. 1, a differential assembly for an automotive vehicle is shown generally at 10. Referring to FIG. 2, the differential assembly 10 includes a differential housing 12 having a first side gear 14 and a second side gear 16 substantially axially aligned and spaced apart from one other. Each of the side gears 14, 16 are supported by the differential housing 12 and are allowed to rotate therein. Each of the side gears 14, 16 are further adapted to engage an axle half-shaft (not shown) of the vehicle.

A plurality of pinion gears 17 substantially axially aligned and spaced apart from each other are mounted rotationally within the differential housing 12. The pinion gears 17 engage the side gears 14, 16. A ring gear 19 is mounted to the differential housing 12 and is adapted to engage a drive shaft (not shown) of the vehicle to transfer rotational movement from the drive shaft of the vehicle to the differential assembly 10.

A clutch pack 18 is mounted between and interconnects the differential housing 12 and the first side gear 14. Preferably, the clutch pack 18 includes a plurality of first plates 20 and a plurality of second plates 22. The first plates 20 include teeth formed within an outer diameter which engage corresponding teeth formed within an inner diameter of the differential housing 12. The second plates 22 include teeth formed within an inner diameter which engage corresponding teeth formed within an outer diameter of the first side gear 14. When an axial force is applied to the clutch pack 18, the first and second plates 20, 22 are forced together. If the force is sufficient, friction will prevent the first and second plates 20, 22 from relative rotation, thereby preventing the first side gear 14 from rotating relative to the differential housing 12.

A ball screw assembly 24 is mounted adjacent the clutch pack 18 to selectively apply axial force to the clutch pack 18, thereby locking the first side gear 14 to the differential housing 12 and preventing relative rotational movement of the first side gear 14 and the differential housing 12.

Preferably, the ball screw assembly 24 includes a ball screw 26 mounted to the differential housing. The ball screw 26 includes an outer surface 28 having an outwardly facing helical channel 30 formed therein. A ball nut 32 extends circumferentially around the ball screw 26. The ball nut 32 includes an inner surface 34 having an inwardly facing helical channel 36 formed therein. The inwardly facing helical channel 36 of the ball nut 32 and the outwardly facing helical channel 30 of the ball screw 26 define a ball channel 38.

A plurality of ball bearings 40 are positioned within the ball channel 38. The ball bearings 40 provide a coupling between the ball screw 26 and the ball nut 32 such that rotational movement of the ball screw 26 and the ball nut 32 relative to one another is translated into axial movement of the ball nut 32 and the ball screw 26 relative to one another. A motor 42 engages one of either the ball screw 26 or the ball nut 32 to rotationally move the ball nut 32 and the ball screw 26 relative to one another.

Referring to FIG. 2, in a first preferred embodiment, the ball screw 26 is rotatable about the differential housing 12, however, the ball screw 26 is axially fixed relative to the differential housing 12. The ball nut 32 is rotatably fixed relative to a differential carrier 43, but is axially moveable relative to the differential carrier 43 and the differential housing 12. The motor 42 engages the ball screw 26 such that when the motor 42 is activated the ball screw 26 rotates relative to the differential housing 12. Preferably the ball screw 26 includes a first spur gear 44 and the motor 42 includes a second spur gear 46 that engages the first spur gear 44. It is to be understood however, that rotation of the motor 42 can be transferred to the ball screw 26 by other means such as by helical gears, or other appropriate means.

As the ball screw 26 rotates, the ball nut 32 moves axially relative to the differential housing 12. The ball nut 32 moves axially toward the clutch pack 18 such that the ball nut 32 applies an axial force to the clutch pack 18, thereby locking the first side gear 14 to the differential housing 12.

Figure 3:
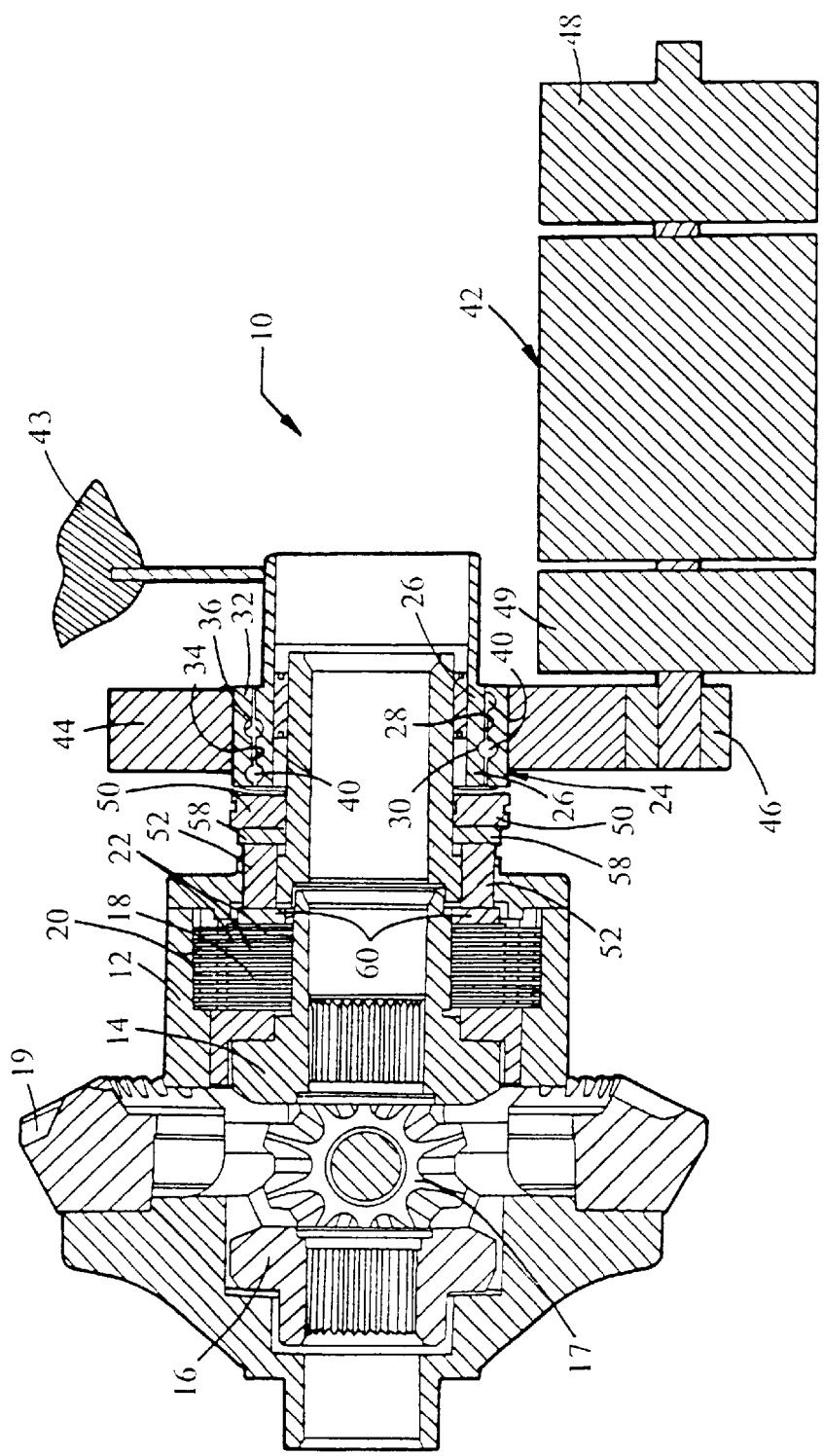
FIG. 3 is a sectional view similar to FIG. 2 of a second preferred embodiment.

Referring to FIG. 3, in a second preferred embodiment the ball screw 26 is axially fixed onto the differential carrier 43. The ball nut 32 is rotatable and axially moveable relative to the differential housing 12. The motor 42 engages the ball nut 32 such that when the motor 42 is activated the ball nut 32 rotates relative to the ball screw 26 and the differential housing 12. Preferably the ball nut 32 includes a first spur gear 44a and the motor 42 includes a second spur gear 46 that engages the first spur gear 44a. It is to be understood however, that rotation of the motor 42 can be transferred to the ball nut 32 by other means such as by helical gears, or other appropriate means.

As the ball nut 32 rotates, the ball nut 32 moves axially relative to the differential housing 12. The ball nut 32 moves axially toward the clutch pack 18 such that the ball nut 32 applies an axial force to the clutch pack 18, thereby locking the first side gear 14 to the differential housing 12.

In either the first or second preferred embodiments, the motor 42 is preferably an electric motor. Preferably, the electric motor 42 includes a brake 48. The brake will allow the motor to be locked into position when the electric power to the motor 42 is cut off. Therefore, if the differential assembly 10 is to be locked for an extended period of time, the brake 48 can be engaged, and the power to the motor 42 turned off. In this way, the life of the electric motor 42 can be prolonged. Alternatively, the electric motor 42 can include a planetary gear set (not shown) to increase or decrease the gear ratio, depending upon the specifications of the electric motor 42 and the desired output to the ball screw assembly 24.

The ball screw assembly provides axial force to the clutch pack 18 that is not dependant upon wear within the clutch pack 18 or within the ball screw assembly 24. As the plates 20, 22 within the clutch pack 18 wear, the ball screw assembly 24 can progress further axially toward the clutch pack 18, thereby providing the same axial force to the clutch pack 18 as when the plates 20, 22 were new. The axial force exerted upon the clutch pack 18 is controlled by the motor 42, therefore, the ball screw assembly 24 will always advance until the axial force being exerted reaches the limitations of the motor 42. Therefore, the differential assembly 10 having a ball screw assembly 24 to actuate the clutch pack 18 is self-adjusting as the clutch pack 18 wears.

Additionally, the ball screw assembly 24 can be reversed beyond the capability of a ball ramp. Generally, the ball screw assembly 24 will reverse only enough to allow relative rotational movement between the first and second plates 20, 22 of the clutch pack 18, thereby unlocking the differential assembly 10 and allowing relative rotational movement between the axle half-shafts. However, under certain circumstances, it may be desirable to back the ball screw assembly 24 away from the clutch pack 18 even further to allow the plates 20, 22 within the clutch pack 18 to cool. This is easily accomplished with the ball screw assembly 24.

Preferably, a Belleville spring 49 is mounted between the ball screw assembly 24 and the thrust bearing 50. The Belleville spring 49 is adapted to place an axial force upon the ball screw assembly 24 to back drive the motor 42 in the event that the motor 42 fails.

Further, the ball screw assembly uses many ball bearings 40. Preferably, approximately fifty ball bearings 40 are positioned within the ball channel 38. Typically in a ball ramp there are three or four ball bearings supporting the entire axial load. The ball screw assembly 24 provides a larger number of ball bearings 40 to support the load, resulting in more even loading and less wear within the ball screw assembly 24.

Preferably, a thrust bearing 50 is positioned between the ball screw assembly 24 and the clutch pack 18. The thrust bearing will allow axial force to be transferred from the ball screw assembly 24 to the clutch pack 18 while allowing either the ball screw 26 or the ball nut 32 to rotate relative to the clutch pack.

In both of the preferred embodiments, the differential housing 12 includes a plurality of thrust pins 52 extending therethrough. Each of the thrust pins 52 have opposing first and second ends 54, 56 and are slidably mounted within the differential housing 12. The first ends 54 engage the thrust bearing 50 and the second ends 56 engage the clutch pack 18, such that axial force is transmitted from the ball screw assembly 24, through the thrust bearing 50 and the thrust pins 52 to the clutch pack 18. Preferably, the thrust pins 52 are spaced evenly about the differential housing 12 such that the axial force of the ball screw assembly 24 is evenly applied to the clutch pack 18. The number of thrust pins 52 can be any appropriate number, but preferably three or more thrust pins 52 are evenly spaced about the differential housing 12.

Further, a first thrust washer 58 is mounted adjacent the first ends 54 of the thrust pins 52 and a second thrust washer 60 is mounted adjacent the second ends 56 of the thrust pins 52. Therefore, axial force is transmitted from the ball screw assembly 24, through the thrust bearing 50 and the first thrust washer 58 to the thrust pins 52, and through the thrust pins 52 and the second thrust washer 60 to the clutch pack 18.

The foregoing discussion discloses and describes two preferred embodiments of the invention. One skilled in the art will readily recognize from such discussion, and from the accompanying drawings and claims, that changes and modifications can be made to the invention without departing from the scope of the invention as defined in the following claims. The invention has been described in an illustrative manner, and it is to be understood that the terminology which has been used is intended to be in the nature of words of description rather than of limitation.

What is claimed is:

1. A differential gear assembly for an automotive vehicle comprising:
   a differential housing;
   a first side gear and a second side gear substantially axially aligned and spaced apart from one other, each of said side gears being supported by said differential housing for relative rotational movement and being adapted to engage an axle half-shaft;
   a clutch pack mounted between and interconnecting said differential housing and said first side gear; and
   a ball screw assembly including a ball screw mounted to said differential housing, said ball screw including an outer surface having an outwardly facing helical channel formed therein, a ball nut extending circumferentially around said ball screw, said ball nut including an inner surface having an inwardly facing helical channel formed therein, a ball channel defined by said inwardly facing helical channel and said outwardly facing helical channel; a plurality of ball bearings positioned within said ball channel, thereby coupling said ball screw and said ball nut such that rotational movement of said ball screw and said ball nut relative to one another is translated into axial movement of said ball nut and said ball screw relative to one another; and a motor adapted to engage one of said ball screw and said ball nut to rotationally move said ball nut and said ball screw relative to one another;
   said ball screw being rotatably and axially fixed onto said differential housing and said ball nut being rotatable and axially moveable relative to said differential housing, said motor engaging said ball nut such that when said motor is activated said ball nut rotates relative to said ball screw and said differential housing, thereby moving said ball nut axially relative to said differential housing such that said ball nut applies an axial force to said clutch pack and locks said first side gear to said differential housing, thereby preventing relative rotational movement of said first side gear and said differential housing.

2. The differential assembly of claim 1 wherein said ball nut includes a first spur gear mounted thereon, and said motor includes a second spur gear which engages said first spur gear.

3. The differential assembly of claim 1 wherein said motor is an electric motor and includes a brake, such that said motor can be locked in position to maintain the position of the ball screw assembly when no power is supplied to the electric motor.

4. The differential assembly of claim 3 wherein said motor further includes a planetary gear set mounted therein.

5. The differential assembly of claim 1 further including:
   a plurality of pinion gears substantially axially aligned and spaced apart from each other, said pinion gears engaging said side gears; and
   a ring gear mounted to said differential housing and adapted to engage a drive shaft of the vehicle to transfer rotational movement from the drive shaft of the vehicle to said differential assembly.

6. The differential assembly of claim 1 further including a thrust bearing positioned between said ball screw assembly and said clutch pack.

7. The differential assembly of claim 6 wherein said differential assembly includes a plurality of slidable thrust pins extending therethrough, said thrust pins including opposing first and second ends, said first ends engaging said thrust bearing and said second ends engaging said clutch pack, such that axial force is transmitted from said ball screw, through said thrust bearing and said thrust pins to said clutch pack.

8. The differential assembly of claim 7 wherein said thrust pins are spaced evenly about said differential housing such that the axial force of said ball screw assembly is substantially evenly applied to said clutch pack.

9. The differential assembly of claim 7 further including a pair of thrust washers, a first thrust washer being mounted adjacent said first ends of said thrust pins and a second thrust washer being mounted adjacent said second ends of said thrust pins, such that axial force is transmitted from said ball screw, through said thrust bearing and said first thrust washer to said thrust pins, and through said thrust pins and said second thrust washer to said clutch pack.

10. A differential gear assembly for an automotive vehicle comprising:
    a differential housing;
    a first side gear and a second side gear substantially axially aligned and spaced apart from one other, each of said side gears being supported by said differential housing for relative rotation therebetween and being adapted to engage an axle half-shaft;
    a clutch pack mounted between and interconnecting said differential housing and said first side gear;
    a ball screw assembly adapted to selectively apply axial force to said clutch pack, thereby locking said first side gear to said differential housing and preventing relative rotational movement of said first side gear and said differential housing;
    said ball screw assembly including a ball screw mounted to said differential housing such that said ball screw is rotatably and axially fixed onto said differential housing, said ball screw including an outer surface having an outwardly facing helical channel formed therein, a ball nut extending circumferentially around said ball screw and mounted to said differential housing such that said ball nut is rotatable and axially moveable relative to said differential housing, said ball nut including an inner surface having an inwardly facing helical channel formed therein, a ball channel defined by said inwardly facing helical channel and said outwardly facing helical channel, and a plurality of ball bearings positioned within said ball channel, thereby coupling said ball screw and said ball nut such that rotational movement of said ball nut is translated into axial movement of said ball nut; and an electric motor engaging said ball nut such that when said motor is activated said ball nut rotates relative to said differential housing and said ball screw, thereby moving said ball nut axially such that said ball nut applies an axial force to said clutch pack and locks said first side gear to said differential housing.

11. The differential assembly of claim 10 wherein said electric motor includes a brake, such that said motor can be locked in position to maintain the position of the ball screw assembly when no power is supplied to the electric motor.

12. The differential assembly of claim 10 further including a thrust bearing positioned between said ball screw assembly and said clutch pack.

13. The differential assembly of claim 12 wherein said differential assembly includes a plurality of slidable thrust pins extending therethrough, said thrust pins including opposing first and second ends, said first ends engaging said thrust bearing and said second ends engaging said clutch pack, such that axial force is transmitted from said ball screw, through said thrust bearing and said thrust pins to said clutch pack.

14. The differential assembly of claim 13 wherein said thrust pins are spaced evenly about said differential housing such that the axial force of said ball screw assembly is evenly applied to said clutch pack.

15. The differential assembly of claim 13 further including a pair of thrust washers, a first thrust washer being mounted adjacent said first ends of said thrust pins and a second thrust washer being mounted adjacent said second ends of said thrust pins, such that axial force is transmitted from said ball screw, through said thrust bearing and said first thrust washer to said thrust pins, and through said thrust pins and said second thrust washer to said clutch pack.

* * * * *

UNITED STATES PATENT AND TRADEMARK OFFICE
CERTIFICATE OF CORRECTION

PATENT NO. : 6,805,653 B2
DATED : October 19, 2004
INVENTOR(S) : Richard M. Krzesicki et al.

It is certified that error appears in the above-identified patent and that said Letters Patent is hereby corrected as shown below:

<u>Title page,</u>
Item [57], ABSTRACT,
Line 4, after "from one" delete "other," and substitute -- another, -- in its place.

<u>Column 5,</u>
Line 34, after "from one" delete "other," and substitute -- another, -- in its place.

<u>Column 6,</u>
Line 51, after "from one" delete "other," and substitute -- another, -- in its place.

Signed and Sealed this

Eighth Day of February, 2005

JON W. DUDAS
*Director of the United States Patent and Trademark Office*